(12) United States Patent
Higuchi

(10) Patent No.: US 6,227,726 B1
(45) Date of Patent: May 8, 2001

(54) ELECTRONIC CAMERA

(75) Inventor: Tatsuji Higuchi, Akiruno (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/287,470

(22) Filed: Apr. 6, 1999

(30) Foreign Application Priority Data

Apr. 8, 1998 (JP) .................................................. 10-096314

(51) Int. Cl.$^7$ .................................................. G03B 19/12
(52) U.S. Cl. .......................................... 396/358; 396/447
(58) Field of Search ................... 396/354, 358, 396/447

(56) References Cited

U.S. PATENT DOCUMENTS

| | | | | |
|---|---|---|---|---|
| 4,730,200 | * | 3/1988 | Kitazawa | 396/447 |
| 4,912,500 | * | 3/1990 | Yokota et al. | 396/358 |
| 5,045,875 | * | 9/1991 | Murata | 396/358 |
| 5,854,657 | * | 12/1998 | Um | 396/358 |
| 6,003,999 | * | 12/1999 | Kitaoka et al. | 396/358 |

FOREIGN PATENT DOCUMENTS 6-29925    4/1994   (JP) .

\* cited by examiner

Primary Examiner—David M. Gray
(74) Attorney, Agent, or Firm—Ostrolenk, Faber, Gerb & Soffen, LLP

(57) ABSTRACT

An electronic camera includes a quick-return mirror pivoted by a drive shaft. The mirror is selectively movable between a luminous flux reflective position in which an image-forming luminous flux from an imaging optical system is reflected toward a view finder optical system and a luminous flux transmissive position in which the image-forming luminous flux is transmitted toward an image pickup device. A transflector is arranged on the quick-return mirror. A shielding member moves to an open position when the quick-return mirror takes the luminous flux reflective position, and moves to an external light shielding position when the quick-return mirror takes the luminous flux transmissive position. An interlocking mechanism has a toggle spring for moving the shielding member in interlock with the quick-return mirror. The electronic camera is thus free from the splitting of the image forming luminous flux reaching the image pickup device, and performs AF, AE, and AWB operations any time.

7 Claims, 3 Drawing Sheets

ELECTRONIC CAMERA

BACKGROUND OF THE INVENTION

1. Field of the Invention

The present invention relates to electronic cameras, and, more particularly, to a camera having a reflective mirror that reflects an image-forming luminous flux to a view finder optical system or transmits the image-forming luminous flux to an image pickup device.

2. Related Art Statement

Electronic cameras have been often provided with a video display unit such as an LCD. The video display unit presents a plurality of advantages. For example, the video display unit may be used as an electronic view finder to determine the field of view and composition during picture taking, and then to check a photographed image after the picture is taken.

In such a video display unit, the LCD consumes a large amount of power, and if zooming, auto-focusing and electronic flash charging are performed at the same time, the electric load of the camera is increased, drawing a large current. Consequently, a battery cannot drive the operations, or the life of the battery is shortened. High-end electronic cameras, which are today commercialized, employ an image pickup device having a pixel array with a degree of integration as high as or higher than 100 million pixels. In contrast, the LCD has a pixel array of 200,000 pixels or so, and the resolution of the LCD is unable to match that of the image pickup device. As a result, the high-resolution image pickup device is not fully exploited, for example, a correct focus cannot be detected with the LCD display in a strict sense.

An optical system, of a quick-return mirror and a penta prism, used in conventional silver-film based cameras may be incorporated in an electronic camera to give a parallax-free and sharp image of a subject for checking.

The means of using the quick-return mirror prevents the luminous flux from reaching the image pickup device during the observation through the view finder optical system. For this reason, the image pickup device remains unable to directly perform auto-focusing (AF), auto-exposure control (AE), and auto-white balancing (AWB). The electronic camera thus suffers a time delay because the image pickup device has to take these process steps after the mirror is flipped up.

To cope with this problem, an optical system for a single-lens reflex camera has been proposed. In such a system, a transflector is arranged between an imaging optical system and an image pickup device. The transflector splits an image-forming luminous flux, guiding part of the luminous flux to the image pickup device and the remaining luminous flux to a view finder optical system Japanese Examined Patent Publication No. 6-29925 discloses a view finder optical system. In the view finder optical system, a prism body having a transflective surface is arranged downstream of the imaging system. Part of the image-forming luminous flux, transmitted through the imaging system, is reflected from the transflective surface and is then totally reflected from the surface of the prism body facing the subject, exits from the prism body, and is focused as an image of the subject. The image of the subject is thus observed in the view finder optical system. Let θ represent the smaller one of the angles between the transflective surface and the optical axis of the imaging system, and the view finder optical system satisfies the condition of $23° < θ < 38°$.

With such a view finder optical system incorporated in an electronic camera, AF, AE and AWB operations are carried out during the observation using the view finder optical system.

However, the above means of using the transflective surface halves the amount of light incident on the image pickup device and presents a darker image observed through the view finder optical system, because the luminous flux is split. Furthermore, the light ray is fed back from the view finder optical system to the image pickup device, adversely affecting the accuracies of AF, AE, AWB and the photographed picture.

SUMMARY OF THE INVENTION

The present invention provides an electronic camera capable of performing AF, AE and AWB operations any time with an image-forming luminous flux reaching an image pickup device with no light loss involved.

An electronic camera of the present invention includes a reflective mirror which selects between a luminous flux reflective position present in an optical path of an image-forming luminous flux, for reflecting at least part of the luminous flux toward a view finder optical system and a luminous flux transmissive position retracted from the optical path of the luminous flux, for transmitting the luminous flux to an image pickup device, and a transflector which, mounted on the reflective mirror, reflects part of the luminous flux to the view finder optical system when the reflective mirror takes the luminous flux reflective position while transmitting part of luminous flux toward the image pickup device.

The present invention will become further apparent from the following detailed explanation.

DETAILED DESCRIPTION OF THE PREFERRED EMBODIMENTS

Figure 1:
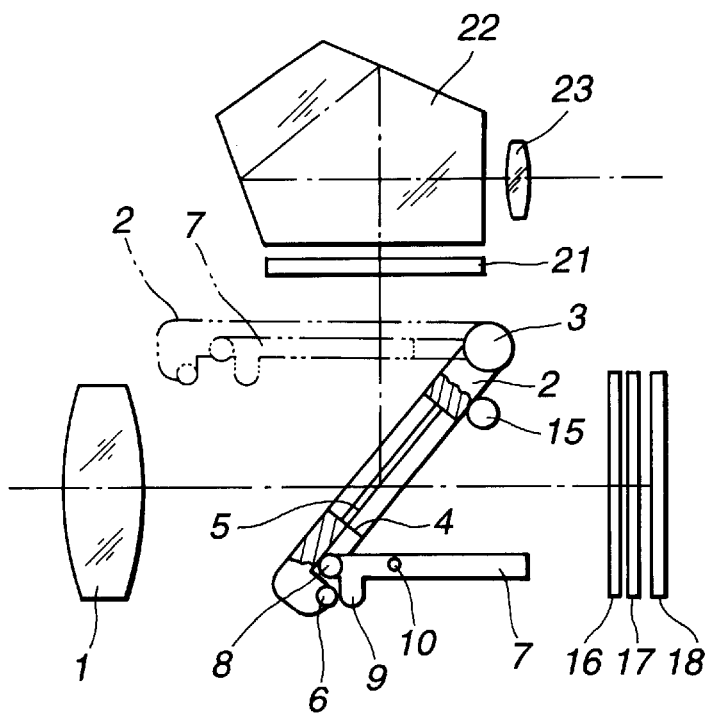
FIG. 1 shows the optical system of an electronic camera of a first embodiment of the present invention, partly in side view and partly in section.

Referring to the drawings, the embodiments of the present invention are now discussed.

Figure 2:
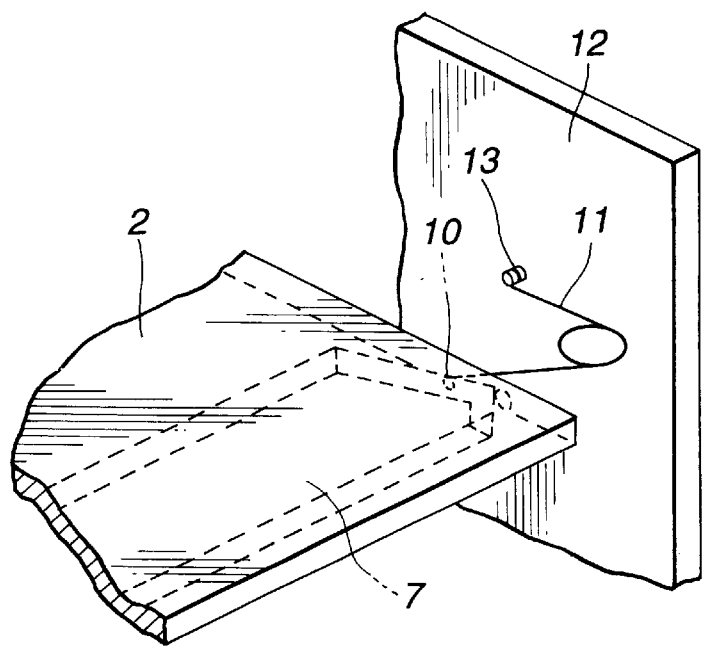
FIG. 2 is a perspective view showing a toggle mechanism for moving a shielding member in the electronic camera of the first embodiment.
Figure 3:
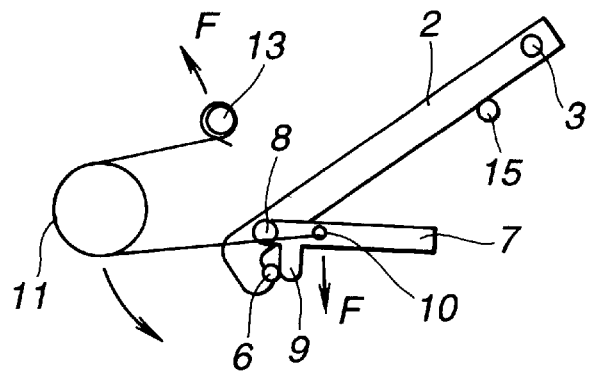
FIG. 3 is a side view showing the state of the toggle mechanism in the electronic camera of the first embodiment when a view finder optical system is used.
Figure 4:
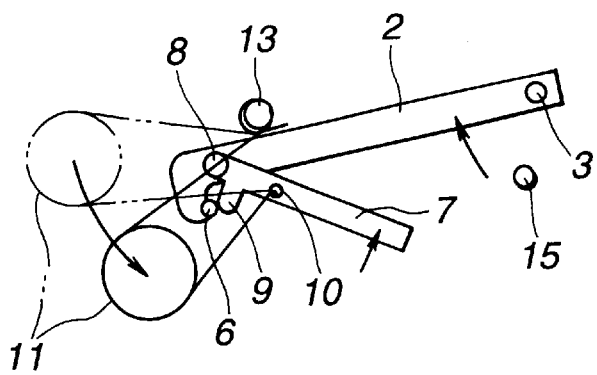
FIG. 4 is a side view showing the state of the toggle mechanism in the electronic camera of the first embodiment when the upward pivotal movement of a mirror is in progress.
Figure 5:
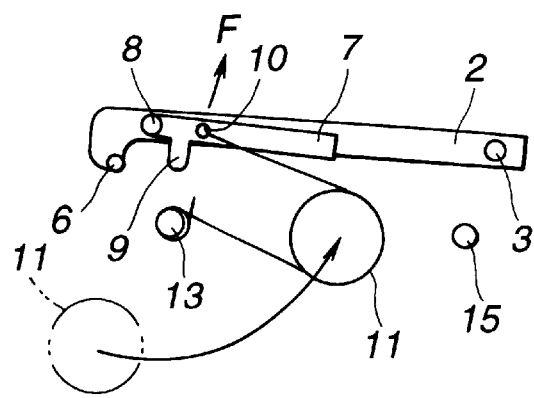
FIG. 5 is a side view showing the state of the toggle mechanism during a picture taking in the electronic camera of the first embodiment.

FIG. 1 through FIG. 5 show a first embodiment of the present invention. FIG. 1 shows the optical system of an electronic camera, partly in side view and partly in sectional view. FIG. 2 is a perspective view showing a toggle mechanism for moving a shielding member. FIG. 3 is a side view showing the state of the toggle mechanism when a view finder optical system is used. FIG. 4 is a side view showing the state of the toggle mechanism when the upward pivotal movement of a mirror is in progress. FIG. 5 is a side view showing the state of the toggle mechanism during a picture taking step.

Referring FIG. 1, the optical system incorporated in this electronic camera is a so-called single-lens reflex type in which an image pickup device and a view finder share an imaging optical system 1 as their objective optical systems.

Specifically, a luminous flux incoming through the imaging optical system 1 reaches first a quick-return mirror 2 as a reflective mirror.

The quick-return mirror 2 is pivotally supported about a drive shaft 3. The quick-return mirror 2 selects between a luminous flux reflective position, as represented by a solid line in FIG. 1, in which the reflective mirror is located in an optical path of an image-forming luminous flux for reflecting at least part of the luminous flux toward a view finder optical system and a luminous flux transmissive position, as represented by a chain line with two dots in FIG. 1, in which the reflective mirror is retracted from the optical path of the luminous flux for transmitting the luminous flux to an image pickup device.

The quick-return mirror 2 has a luminous flux passage hole 4 in its approximate center, and a transflector 5, constructed of a semi-transmissive mirror, is installed in the luminous flux passage hole 4.

In its luminous flux reflective position, the transflector 5, mounted on the quick-return mirror 2, reflects part of the luminous flux to the view finder optical system while transmitting the remaining luminous flux to the image pickup device.

A planar shielding member 7, large enough to shield the transflector 5, is attached on one edge of the quick-return mirror 2 in a manner such that the shielding member 7 is pivoted about an axis of rotation 8.

The shielding member 7 is set to its open position where the shielding member 7 does not block the passage of the luminous flux as shown by a solid line in FIG. 1 when the quick-return mirror 2 takes the luminous flux reflective position. The shielding member 7 is set to its external light shielding position for preventing an external light from entering the image pickup device from the transflector 5, as represented by a chain line with two dots in FIG. 1, when the quick-return mirror 2 takes the luminous flux transmissive position.

The shielding member 7 has an L-shape in section, and its one locking arm 9 abuts a pivot restraint portion 6 of the quick-return mirror 2 to restrain the pivotal movement of the quick-return mirror 2 in one direction.

The shielding member 7 has a spring hook 10. Referring to FIG. 2, one end of a toggle spring 11 is anchored to the spring hook 10 and the other end of the toggle spring 11 is anchored to a spring hook 13 projecting from the inner wall of a mirror box 12. The toggle spring 11 urges both the spring hook 10 and the spring hook 13 to move away from each other in a mutually parting direction.

As will be discussed later in more detail, a toggle mechanism employing the toggle spring 11 is interlocked with the quick-return mirror 2. Specifically, the toggle mechanism moves the shielding member 7 to its open position parted from the transflector 5 as the quick-return mirror 2 pivots to its luminous flux reflective position. The toggle mechanism also moves the shielding member 7 to its external light shielding position alongside the transflector 5 as the quick-return mirror 2 pivots to its luminous flux transmissive position.

The quick-return mirror 2 is stopped in its pivotal movement by a stopper 15, which defines the luminous flux reflective position.

Arranged in the optical path of the luminous flux transmitted through the transflector 5 are a low-pass filter 16 for filtering out a high-frequency component noise, an IR cutting filter 17 for removing infrared light components, and the image pickup device 18 serving as an image plane of the imaging optical system 1.

Arranged in the optical path of the luminous flux reflected from the transflector 5 is a focusing screen 21 at a position optically equivalent to the position of the image pickup device 18 serving as the image plane of the imaging optical system 1. A penta prism 22 is arranged above the focusing screen 21 to correctly orient the image of the subject focused on the focusing screen 21. The luminous flux leaving the penta prism 22 is enlarged and observed through an eyepiece lens 23.

The view finder optical system includes the focusing screen 21, penta prism 22 and eyepiece lens 23.

Referring to FIG. 3 through FIG. 5, the operation of the electronic camera thus constructed is now discussed.

When the photographer observes the subject through the view finder optical system, the quick-return mirror 2, placed in the optical path of the image-forming luminous flux, is positioned to be engaged with the stopper 15 at approximately 45° with respect to the optical axis of the imaging optical system 1, with its reflective surface looking upward.

In this luminous flux reflective position, the quick-return mirror 2 reflects part of the image-forming luminous flux toward the view finder optical system while transmitting the remaining image-forming luminous flux through the transflector 5 to the image pickup device 18.

The photographer observes the image of the subject through the view finder optical system while AF, AE and AWB operations are performed using the video signal from the image pickup device 18.

The toggle spring 11 urges generally upwardly the spring hook 13 with a force F as shown in FIG. 3 while urging the spring hook 10 generally downwardly with a force F as shown in FIG. 3. The shielding member 7 is thus urged clockwise about the axis of rotation 8, and is positioned with its locking arm 9 abutting the pivot restraint portion 6. In this way, the shielding member 7 is in its open position where the image-forming luminous flux is not blocked.

The quick-return mirror 2 is pivoted upwardly from the state shown in FIG. 3, and reaches the state shown in FIG. 4.

Since the toggle spring 11 works to part the spring hook 10 from the spring hook 13 as already described, the direction of the urging of the toggle spring 11 varies depending on the relative positions of the spring hook 10 and spring hook 13.

When the quick-return mirror 2 is pivoted further past a position where the spring hooks 10 and 13 and the axis of rotation 8 are aligned in a line, the urging of the toggle spring 11 becomes a force that counterclockwise pivots the shielding member 7 about the axis of rotation 8, and the locking arm 9 begins parting from the pivot restraint portion 6.

The quick-return mirror 2 takes the position as shown in FIG. 5 when it completes the pivotal movement.

In this state, the shielding member 7 is placed, alongside the transflector 5 of the quick-return mirror 2, to the external light shielding position, where no external light is let in through the transflector 5 to the image pickup device. The shielding member 7 is counterclockwise urged about the axis of rotation 8 by the toggle spring 11, keeping its external light shielding position.

To return the quick-return mirror 2 to its reflective position subsequent to the photographing, the above steps are reversed.

In the first embodiment, the use of the transflector in the quick-return mirror permits the photographer to perform the AF, AE, and AWB operations using the video signal from the image pickup device even when the photographer observes the subject through the view finder optical system. This arrangement shortens the time delay in the picture taking.

By pivoting up the quick-return mirror 2 during the photographing, the image-forming luminous flux reaches the image pickup device without suffering a light loss involved in flux splitting. A bright and sharp picture is thus taken. Given the same image pickup sensitivity, a darker subject can be photographed.

Since the transflector is covered with the shielding member with the quick-return mirror pivoted upward, no external light is directed to the image pickup device from the view finder optical system. The image pickup device is thus free from the external light and thus offers an image free from the external light.

Figure 6:
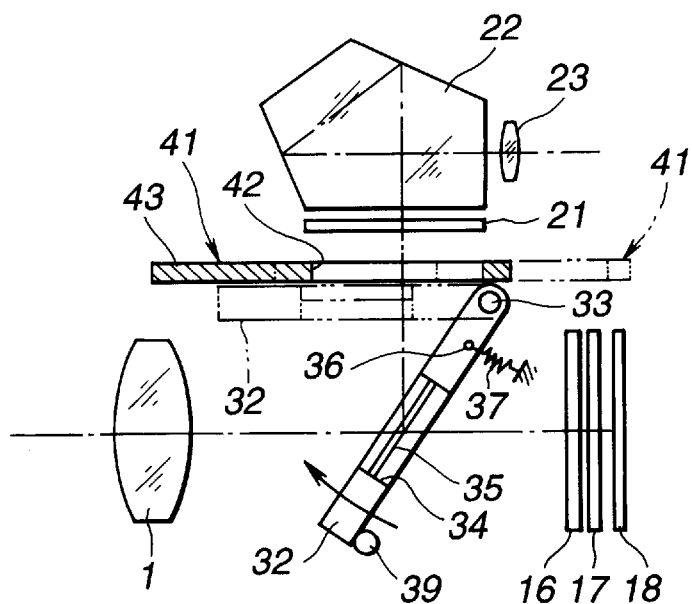
FIG. 6 shows the optical system of an electronic camera of a second embodiment of the present invention, partly in side view and partly in section.
Figure 7:
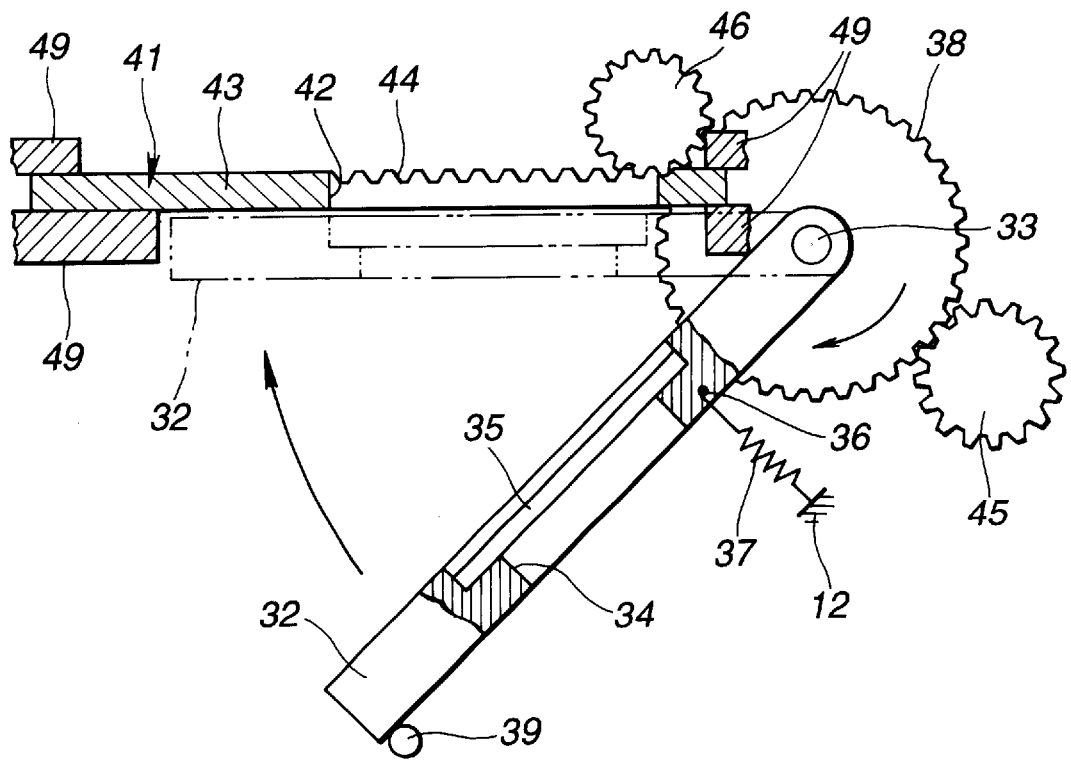
FIG. 7 shows an interlocking mechanism for displacing a shielding member in the electronic camera of the second embodiment, partly in side view and partly in section.

FIG. 6 and FIG. 7 shows a second embodiment of the present invention. FIG. 6 shows the optical system of an electronic camera, partly in side view and partly in section. FIG. 7 shows an interlocking mechanism for moving a shielding member, partly in side view and partly in section. Components identical to those described with reference to FIG. 1 through FIG. 5 are designated with the same reference numerals, and the discussion about them are not repeated. The difference only between the first and second embodiments is discussed here.

In the electronic camera of the second embodiment, the image-forming luminous flux from the imaging optical system 1 reaches a quick-return mirror 32 as a reflective mirror.

The quick-return mirror 32 is pivotally supported about a drive shaft 33. The quick-return mirror 32 selects between a luminous flux reflective position, as represented by a solid line in FIG. 6, and a luminous flux transmissive position, as represented by a chain line with two dots in FIG. 6.

The quick-return mirror 32 has a luminous flux passage hole 34 in its approximate center. Installed in the luminous flux passage hole 34 is a transflector 35, constructed of a semi-transmissive mirror which transmits part of an incident luminous flux while reflecting the remaining luminous flux.

The quick-return mirror 32 has a spring hook 36. One end of a spring 37 is anchored to the spring hook 36 while the other end of the spring 37 is anchored to the mirror box 12. The quick-return mirror 32 is thus urged counterclockwise about the drive shaft 33. A stopper 39 restrains the counterclockwise pivotal movement of the quick-return mirror 32 about the drive shaft 33.

A drive gear 38 is rigidly attached to the drive shaft 33. The drive gear 38 is in mesh with a motor gear 45 for transmitting the rotary power of an unshown motor. When the motor operates, the drive shaft 33 is driven through the drive gear 38, changing the position of the quick-return mirror 32.

The drive gear 38 is also in mesh with a shielding member drive gear 46. The shielding member drive gear 46 is meshed with a rack 44 of a shielding member 41 which is arranged in the vicinity of and generally in parallel with the focusing screen 21.

The shielding member 41 includes the rack 44 which receives the rotary power from the shielding member drive gear 46 to move the shielding member 41 itself in a direction generally parallel with the optical axis of the imaging optical system 1, a luminous flux passage hole 42 for permitting a luminous flux to pass therethrough when the shielding member 41 is in its open position represented by a solid line in FIG. 6, and a luminous flux shielding plate 43 for blocking the passage of the external light in its external light shielding position represented by a chain line with two dots in FIG. 6.

The shielding member 41 is supported by a frame 49 of the electronic camera body in a manner such that the shielding member 41 is guided in a direction generally parallel with the optical axis of the imaging optical system.

The operation of the electronic camera is now discussed.

The photographer observes the image of the subject through the view finder optical system in the state shown in FIG. 6 while AF, AE and AWB operations are performed using the video signal from the image pickup device 18.

When a command for photographing is entered in this state, the motor starts operating, rotating the motor gear 45. The quick-return mirror 32 is then pivoted upward.

The pivotal movement of the drive gear 38 along with the pivotal movement of the mirror causes the shielding member drive gear 46 to rotate counterclockwise, and causes the shielding member 41 to move in a direction generally parallel with the optical axis of the image-forming luminous flux, to the right in FIG. 7.

When the quick-return mirror 32 reaches its luminous flux transmissive position represented by the chain line with two dots in FIG. 7, the transflector 35 of the quick-return mirror 32 faces the luminous flux shielding plate 43 of the shielding member 41. In this way, no external light is permitted into the image pickup device from the transflector 35.

To return the quick-return mirror 32 to its reflective position subsequent to the photographing, the above steps are reversed.

In the second embodiment, the shielding member, which is the frame of the camera body, is interlocked with the quick-return mirror and is moved by gears in a direction generally parallel with the optical axis of the image-forming luminous flux. With this arrangement, the second embodiment presents the same advantage as that of the first embodiment.

In this invention, it is apparent that a wide range of various working modes can be formed on the basis of this invention disclosure without departing from the spirit and scope of the invention. Accordingly, this invention is not to be restricted by any specific disclosed embodiment, but only by the appended claims.

What is claimed is:

1. An electronic camera comprising:
   a camera body,
   a reflective mirror mounted within the camera body so as to move to selectively occupy a luminous flux reflective position present in an optical path of an image-forming luminous flux, for reflecting at least part of the luminous flux toward a view finder optical system and a luminous flux transmissive position retracted from the optical path of the luminous flux, for transmitting the luminous flux to an image pickup device, and a transflector mounted on the reflective mirror which reflects part of the luminous flux to the view finder optical system when the reflective mirror occupies the luminous flux reflective position, while transmitting part of the luminous flux being propagated through the transflector directly on the image pickup device, wherein the image pickup device generates a video signal to perform auto-focusing, auto-exposure control, and auto-white balancing.

2. An electronic camera according to claim 1, further comprising a shielding member which is set to an open position not to block the passage of the image-forming luminous flux when the reflective mirror takes the luminous flux reflective position, and which is set to an external light shielding position to block the passage of an external light through the transflector to the image pickup device when the reflective mirror takes the luminous flux transmissive position.

3. An electronic camera according to claim 2, further comprising an interlocking mechanism which sets the shielding member to the open position in interlock with the reflective mirror which moves to the luminous flux reflective position, and which sets the shielding member to the external light shielding position in interlock with the reflective mirror which moves to the luminous flux transmissive position.

4. An electronic camera according to claim 3, wherein the shielding member is a planar member large enough to shield the transflector and is rotatably supported on the reflective mirror, and wherein the interlocking mechanism sets the shielding member to the open position, parted from the transflector, in interlock with the reflective mirror which is pivoted to the luminous flux reflective position, and sets the shielding member to the external light shielding position, alongside with the transflector, in interlock with the reflective mirror which is pivoted to the luminous flux transmissive position.

5. An electronic camera according to claim 4, wherein the interlocking mechanism is a toggle mechanism comprising a toggle spring with one end fixed and the other end connected to the planar shielding member.

6. An electronic camera according to claim 3, wherein the shielding member comprises a frame comprising a luminous flux passage hole for permitting a luminous flux to pass therethrough when the shielding member is in the open position and a luminous flux shielding portion that blocks the passage of an external light when the shielding member is in the external light shielding position; and wherein the interlocking mechanism moves the shielding member in a direction generally parallel with the optical axis of the image-forming luminous flux, in interlock with the reflective mirror that is pivoted between the luminous flux reflective position and the luminous flux transmissive position.

7. An electronic camera according to claim 6, wherein the interlocking mechanism comprises a rack formed on the frame of the shielding member, and a gear, in mesh with the rack, for transmitting a pivotal movement of the reflective mirror.

* * * * *